Figure 1:
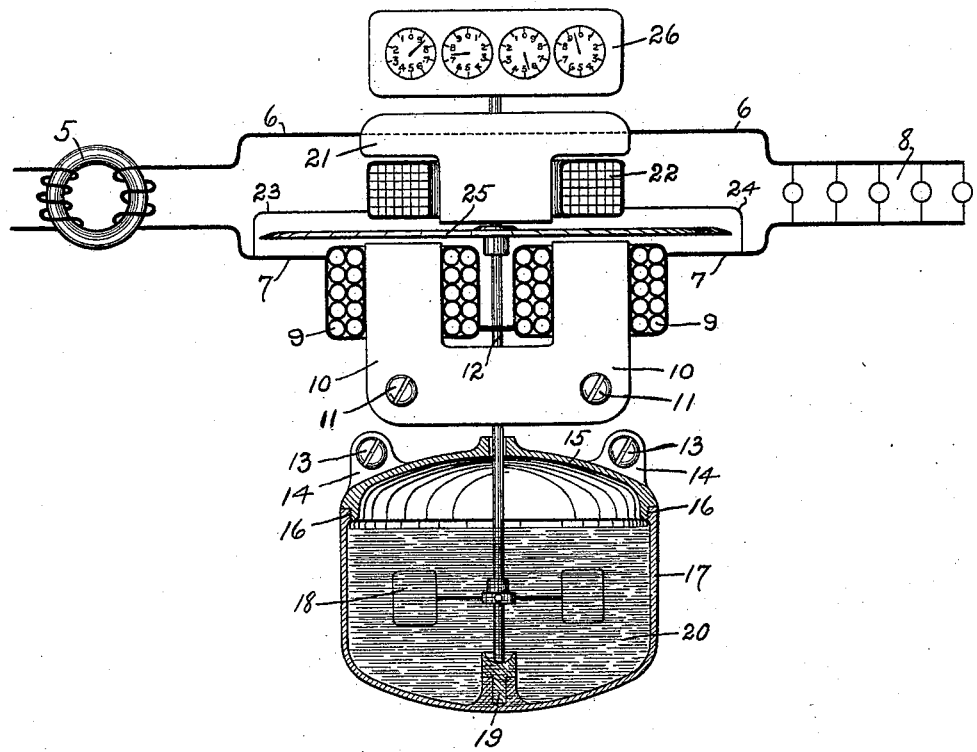

No. 619,734. Patented Feb. 21, 1899.
T. DUNCAN.
ELECTRIC METER.
(Application filed June 2, 1898.)
(No Model.) 2 Sheets—Sheet 1.

Witnesses
Samuel R. Bachtel
John E. Dalton

Inventor
Thomas Duncan

THE NORRIS PETERS CO., PHOTO-LITHO., WASHINGTON, D. C.

No. 619,734. Patented Feb. 21, 1899.
T. DUNCAN.
ELECTRIC METER.
(Application filed June 2, 1898.)

(No Model.) 2 Sheets—Sheet 2.

Witnesses
Samuel R. Bachtel.
John E. Dalton

Inventor
Thomas Duncan

UNITED STATES PATENT OFFICE.

THOMAS DUNCAN, OF FORT WAYNE, INDIANA.

ELECTRIC METER.

SPECIFICATION forming part of Letters Patent No. 619,734, dated February 21, 1899.

Application filed June 2, 1898. Serial No. 682,415. (No model.)

*To all whom it may concern:*

Be it known that I, THOMAS DUNCAN, a citizen of the United States, residing at Fort Wayne, in the county of Allen and State of Indiana, have invented certain new and useful Improvements in Electric Meters; and I do declare the following to be a full, clear, and exact description of the invention, such as will enable others skilled in the art to which it appertains to make and use the same, reference being had to the accompanying drawings, and to the figures of reference marked thereon, which form a part of this specification.

The present invention relates to electricity motor-meters of the induction type for alternating currents, and has for its object the production of a meter that will start on small loads and give a straight-line-speed characteristic.

In meters of this class it has been customary heretofore to employ a retarding device, usually in the form of a winged fan, opposing the air as a retarding medium, but which is faulty on account of its not offering resistance enough to the motion of the fan-wings without increasing their area or radius, or both, which is again seriously detrimental on account of the increase in weight also taking place. The only manner now recognized in which accuracy on small loads can be obtained is by making the revoluble parts of the meter as light as possible and the torque and retardation as great as possible without necessitating the expenditure of any more energy than is permissible or required by central-station engineers. The present improvement is productive of the foregoing requirements—*i. e.*, minimum friction by the reduction in weight of the revoluble parts, increased retardation with fans of small radius by the employment of a suitable liquid instead of air, and a strong efficient torque by the arrangement of the energizing-coils of the meter parts. The principal elements which I employ in the present invention are a series coil or coils carrying the main current supplied to the translating devices, a shunt-coil receiving currents from the said series coil by being connected in multiple or shunted to the terminals thereof, an aluminium disk armature revoluble midway or between the said series and shunt coils, a suitable U-shaped iron ore upon which are mounted the series coils, and a retarding device consisting of a winged fan revolving in superfine paraffin-oil.

Figure 2:
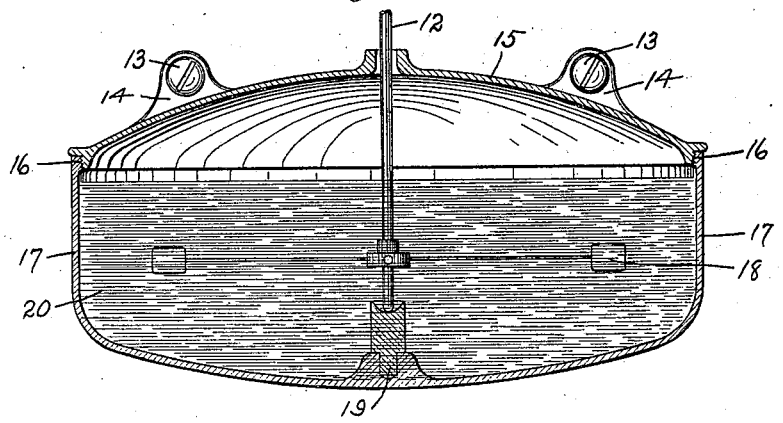
Figure 3:
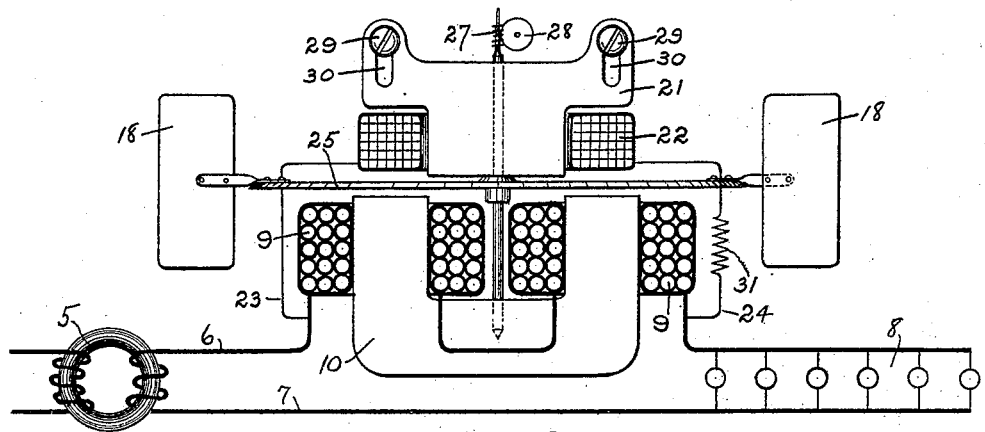
Figure 4:
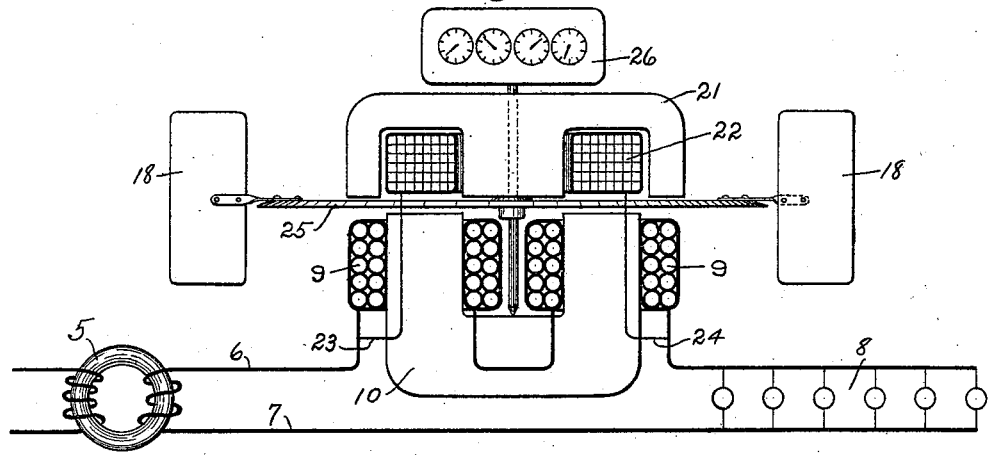
Figure 5:
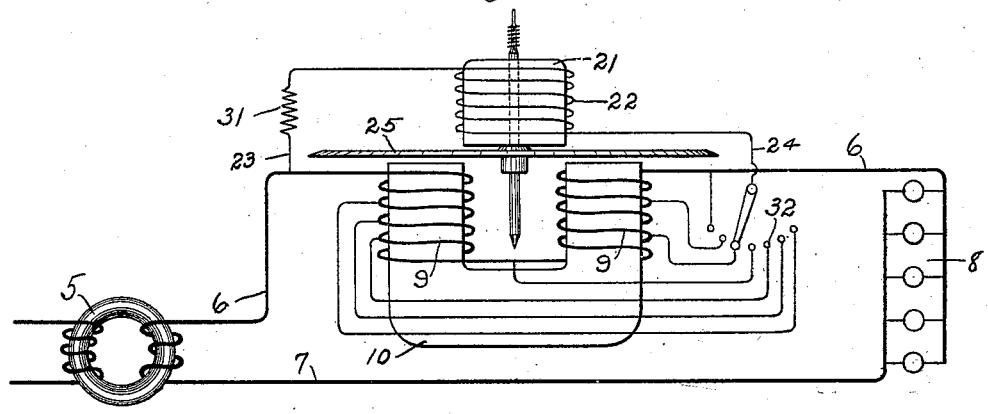

In the accompanying drawings, which form part of the specification, and in which similar numerals indicate similar parts throughout, Figure 1 is a front elevation showing the series coils, shunted lagging coil, and retarding device in section. Fig. 2 is another sectional elevation of a modified form of the retarding device. Fig. 3 shows the manner in which the speed of the meter may be regulated by means of the adjustable iron core, located inside the shunted lagging coil. Fig. 4 shows another form of iron core which is multipolar in construction and which may be used in conjunction with the shunted lagging coil. Fig. 5 is also a view in elevation showing diagrammatically the connections and windings of the various coils constituting the motor part of the invention.

The operation of my improvement may be described with reference to Fig. 1 as follows: The current from the transformer 5 passes through the series coils 9 in supplying the translating devices 8, and in so doing it magnetizes the U-shaped iron core 10. If the translating devices consist of incandescent lamps, this magnetization of the iron core 10 will be approximately coincident in phase with the electromotive force of the transformer 5, and with a given number of turns on the said core 10 the strength or intensity of its magnetism will vary with the amount of current through the circuit-leads 6 and 7. The lagging shunt-coil 22 has its terminals 23 and 24 connected to the terminals of the series coils 9, and since the coil 22 has a greater number of turns than the series coils 9 its self-induction will be greater, thereby causing the current through it to lag behind the current through the said series coils by a number of degrees that must of necessity be less than ninety and dependent upon the number of turns it contains and the amount of current passing through it. This current through the coil 22 and which lags behind the current through the series coils 9 magnetizes the iron core 21, said magnetism also lagging behind the magnetism of the series coils and core 10. This difference in phase between the magnetization of the series core 10 and the shunt-core 21 causes their magnetisms to combine into a common resultant magnetic field which shifts laterally and in so doing encounters the closed revoluble aluminium disk armature 25 and sets it in rotation in a manner now well understood by those skilled in the art. Any change in the strength of current through the series coil 9 will also be accompanied by a corresponding change in the strength of current through the shunted lagging coil 22, thereby exerting a torque that varies as the square of the current through the translating devices 8. It becomes necessary, therefore, to apply some load or system of retardation to the spindle 12 or revoluble part of the meter which will vary as the square of the revolutions in order that the resulting speed may be exactly proportional to the current through the translating devices. To obtain this requisite retardation, I employ a winged fan 18, secured to and revoluble with the spindle 12, which also carries the armature 25. This winged fan is immersed in pure paraffin-oil, which is practically non-volatile and much superior to any liquid I have experimented with. Both the oil and winged fan are contained in a pendent metallic cup-shaped receptacle 17, which is made to be detachable from the support and cover 15 by means of a threaded joint 16, as shown. The upper supporting-cover 15 is firmly secured in any manner to a suitable support by means of the lugs 14 and screws 13. The bearing 19, upon which the spindle 12 is supported, is situated at the bottom of the pendent cup 17. This makes the said bearing easy of access, and from the fact of its being continually immersed in the oil it lasts much longer and also eliminates the error of increasing friction with use, which is such a troublesome factor in meters now upon the market.

On account of the great difference in the densities of air and paraffin-oil I am enabled to obtain a much greater retardation in oil with a very much smaller fan-surface than is possible with air such as is used in other meters at the present time. By reducing the fan area the weight is also reduced, which largely assists in eliminating the friction and inertia of the revoluble parts of the meter. This, coupled with the fact that on very slow speeds in a liquid the resistance to motion is not exactly as the square of the speed, but somewhat less, enables me to obtain an accuracy on the smallest loads that heretofore has not been obtainable. When calibrating the meter, the adjustment of speed is regulated by the iron core 21, which is either raised up out of or inserted down into the shunt lagging coil 22.

Fig. 2 varies from Fig. 1 only in its diameter, when much smaller fans may be used.

Fig. 3 differs from Fig. 1 by having its retarding-fans attached to the perimeter of the disk armature instead of being immersed in oil and the addition of a resistance 31 in series with the shunt lagging coil 22. Said resistance is adapted to assist in regulating the speed of the armature, as is also the core 21, with its slots 30 and set-screws 29, which allows vertical adjustment of the latter. The revolutions of the spindle are communicated to the registering-train 26 by means of the worm 27 and worm-wheel 28.

Fig. 4, like Fig. 3, has its retarding-fans attached to the perimeter of the disk armature for the purpose of showing that the arrangement of actuating-coils of the motor part of the invention may also be used in conjunction with air as the retarding medium, if desired.

Fig. 5 shows a switch 32, the function of which is to connect the terminals 23 and 24 of the shunt lagging coil 22 to various parts of the windings of the series coils 9 instead of being connected to their extreme ends or terminals, as shown in Figs. 1, 3, and 4. The switch 32 may in this manner be used to regulate the speed of the armature.

The series field-core 10 may be secured in any suitable manner by means of the supporting-screws 11, and various modifications in the shape or form of the oil-containing cup 17, with its cover 15, may be resorted to without departing from the spirit or scope of my invention. I have also discovered experimentally that by the addition of a little kerosene-oil mixed with the paraffin-oil the coefficient of density and expansion is reduced to a negligible degree when exposed to the different temperatures of the seasons and in locations where modern practice requires the installation of electric meters.

What I desire to secure by Letters Patent is—

1. In an induction coulomb motor-meter the combination of the series field-coils 9; the laminated iron core 10 upon which the said series field-coils are mounted; a revoluble metallic disk armature; a coil 22 connected in multiple to the said series field-coils and receiving current from the terminals of the same; an iron core in coöperative relation with the said coil 22; and a retarding device comprising a detachable cup 17, an oleous liquid, a winged fan revoluble in said oleous liquid; the said winged fan and liquid being contained within the said detachable cup 17 as set forth.

2. In an induction coulomb motor-meter the combination of the series coils 9; the iron core 10; the coil 22 in multiple to the said coils 9; the iron core 21; the revoluble disk armature 25; a spindle 12 to which said armature is secured; a winged fan 18 revoluble with the said spindle and armature; a pendent and detachable cup 17 containing the said winged fan; an oleous liquid also contained within the said cup 17 for the purpose set forth; a supporting-cover 15; a threaded joint 16; and a suitable registering mechanism.

3. The combination with a motor-meter for electric currents of a retarding mechanism, consisting of a plurality of wings, a spindle carrying the said wings, a suitable liquid opposing the motion or revolutions of said wings, a detachable receiver or cup containing the said liquid and wings, and a suitable bearing 19 secured to the base of said detachable receiver, as and for the purpose herein set forth.

4. In a retarding device the combination of a winged fan, a liquid opposing the revolutions or motion of the said winged fan and consisting of pure paraffin-oil, a detachable receiver having a screw-threaded joint for securing it to a suitable support and containing the said winged fan and paraffin-oil, and a combination cover and support 15 as and for the purpose herein set forth.

5. In a liquid-retarding device for electric meters a revoluble winged fan, an oil opposing the revolutions of said winged fan and consisting of paraffin-oil and kerosene-oil in the proportions herein set forth, and a detachable receiver which incloses both the said winged fan and said oleous mixture.

In testimony that I claim the foregoing as my invention I have signed my name, in the presence of two witnesses, this 24th day of May, 1898.

THOMAS DUNCAN.

Witnesses:
PAUL T. HOPPE,
M. GRACE WEBBER.